(12) United States Patent
Story et al.

(10) Patent No.: US 6,478,077 B1
(45) Date of Patent: Nov. 12, 2002

(54) SELF SUPPORTING HEAT TRANSFER ELEMENT

(75) Inventors: Grosvenor Cook Story, Livermore, CA (US); Ray Orico Baldonado, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 0 days.

(21) Appl. No.: 09/859,143

(22) Filed: May 15, 2001

(51) Int. Cl.[7] .............................................. F28D 15/00
(52) U.S. Cl. ...................... 165/104.12; 62/480; 62/46.2
(58) Field of Search ........................... 165/104.12, 907; 62/46.2, 480, 931

(56) References Cited

U.S. PATENT DOCUMENTS

| | | | | |
|---|---|---|---|---|
| 4,736,596 A | * | 4/1988 | Iguchi et al. | 165/104.12 |
| 4,928,496 A | * | 5/1990 | Wallace et al. | 62/46.2 |
| 5,585,145 A | * | 12/1996 | Maier-Laxhuber et al. | 165/104.12 |
| 5,987,895 A | * | 11/1999 | Nishimura et al. | 62/46.2 |
| 6,182,717 B1 | * | 2/2001 | Yamashita | 62/46.2 |
| 6,318,453 B1 | * | 11/2001 | Ovshinsky et al. | 165/104.12 |

FOREIGN PATENT DOCUMENTS

JP 62-270898 * 11/1987 ............ 62/46.2

* cited by examiner

Primary Examiner—Denise L. Esquivel
Assistant Examiner—Terrell McKinnon
(74) Attorney, Agent, or Firm—Timothy P. Evans

(57) ABSTRACT

The present invention provides an improved internal heat exchange element arranged so as to traverse the inside diameter of a container vessel such that it makes good mechanical contact with the interior wall of that vessel. The mechanical element is fabricated from a material having a coefficient of thermal conductivity above about 0.8 W cm$^{-1\circ}$K$^{-1}$ and is designed to function as a simple spring member when that member has been cooled to reduce its diameter to just below that of a cylindrical container or vessel into which it is placed and then allowed to warm to room temperature. A particularly important application of this invention is directed to a providing a simple compartmented storage container for accommodating a hydrogen absorbing alloy.

12 Claims, 16 Drawing Sheets

US 6,478,077 B1

SELF SUPPORTING HEAT TRANSFER ELEMENT

The United States Government has rights in this invention pursuant to Contract No. DE-AC04-94AL85000 between the United States Department of Energy and Sandia Corporation, for the operation of the Sandia National Laboratories.

BACKGROUND OF THE INVENTION

1. Field of the Invention

The present invention relates generally to an improved design for an internal heat exchange fin. In particular, the present invention relates to a simple spring-loaded fin design which may be placed easily into, and fixed within, an extruded container or vessel. A particularly important application of this invention is directed to a storage containers for accommodating a hydrogen absorbing alloy.

2. Background Art

In recent years devices such as fuel cells, heat pumps, and motor vehicles have been, and continue to be developed which rely upon hydrogen gas as an energy source. Hydrogen gas typically is supplied to these devices utilizing a hydrogen absorbing alloy which can reversibly absorb and desorb hydrogen. Furthermore, the alloy is usually accommodated in the form of a powder or molded body disposed within a containment vessel.

It is known that in order to provide a stable, reversible supply of hydrogen gas from the hydride alloy it is necessary to also provide a means for introducing and removing heat to the alloy. Various methods have been proposed in the art for accomplishing this task. Most of these methods generally conform either to burying an exchange tube 102 with a plurality of heat exchange fins 110, attached thereto, into a volume of the hydride alloy 104, as in FIGS. 1A and 1B, or contacting the alloy volume with a series of plates 201 attached to an exterior surface 202 which may be heated or cooled with one of more exchange tubes 203, as in FIG. 2. Examples of both of these approaches are described in U.S. Pat. Ser. Nos. 5,797,269, 4,165,569 and 4,819,718.

Structures heretofore used for holding the hydride material and storing the hydrogen have typically included a storage container having a plurality of conduits running through the container. The hydride material is placed in the container and a heat exchange medium passed through the conduits either to cool the hydride material, when storing the hydrogen, or to heat the hydride material, when releasing the hydrogen. One of the problems with this type of structure is that, because of the geometry of the conduits relative to the hydride material, some of the hydride material is disposed in locations too far from the conduits to readily absorb or release hydrogen. That is, because the heat transfer path between the heat exchange medium and some hydride material is long, either the hydrogen will not be absorbed or released from such material, or the time required for such absorption or release is longer than desired. Of course, increasing the number of conduits helps but this also reduces the space available in the container for holding the hydride material and increases the weight and cost of construction of the container. What is needed, therefore, is a heat transfer structure which can contact a greater percentage of the reactor bed media surface area across a greater cross section of that reactor bed.

SUMMARY OF THE INVENTION

Heat exchangers of varying designs are well known in the art, particularly tube and plate designs wherein a tortuous flow path is imposed on a circulating fluid. As noted, such structures, if they are to be efficient, are generally comprised of a substantial number of elements making them difficult and expensive to manufacture. Furthermore, application of this type of heat exchanger typically requires penetrating the containment vessel wall in order to introduce a heating source since the exchange elements themselves are not necessarily in thermal contact with the container wall which would allow for conductive heat transfer through that wall.

It is therefore an object of this invention to provide a simple internal element to function as a heat transfer "fin" for a heat exchanger.

It is a further object of this invention to provide an internal element which may be set in place within a vessel such that it remains mechanically self-supporting and further such that it provides effective thermal coupling between itself and the vessel wall.

It is yet another object of this invention to provide an internal heat transfer element which will not buckle when constrained by a wall.

It is an object of the present invention to provide hydride storage and heat exchanger structures adapted to enable the efficient and rapid absorption and release of hydrogen by hydride material contained in the structure.

It is also an object of the present invention to provide such structures in which a heat exchange medium may be applied thereto to uniformly and evenly heat or cool the hydride material.

DETAILED DESCRIPTION OF THE INVENTION

Figure 1A:
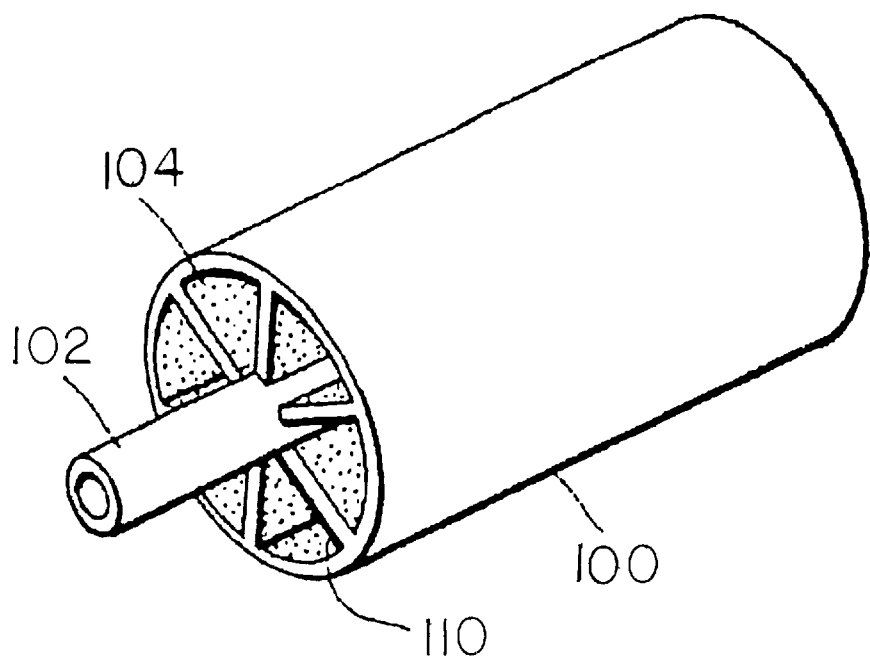
FIGS. 1A and 1B shows a prior art heat exchanger used in connection with a hydride storage system wherein the heat exchanger comprises a plurality of radial fins attached longitudinally to a conduit tube.
Figure 1B:
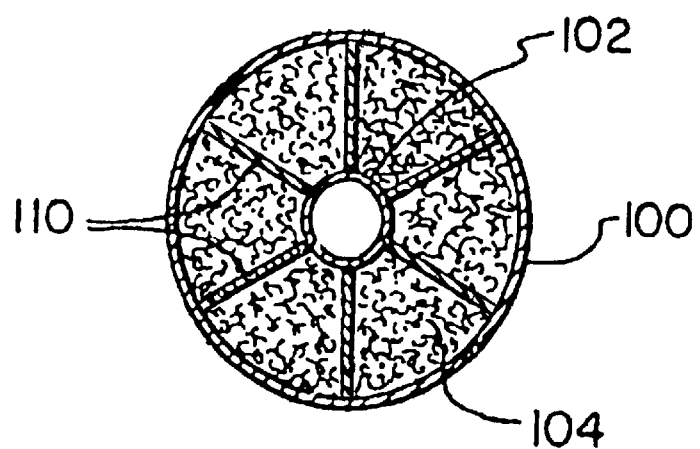
Figure 2:
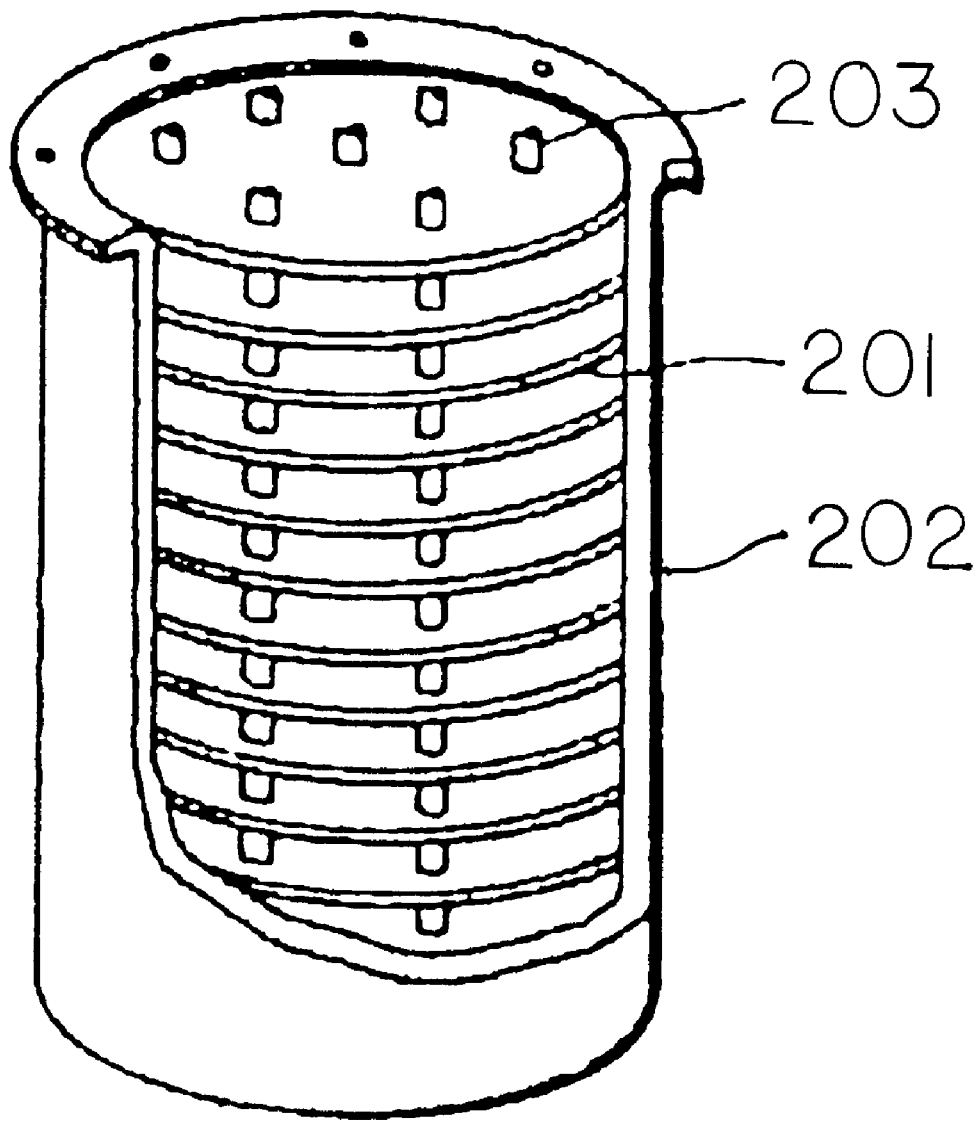
FIG. 2 shows another prior art heat exchanger used in connection with a hydride storage system wherein the heat exchanger comprises a plurality of plates and tubes.
Figure 3A:
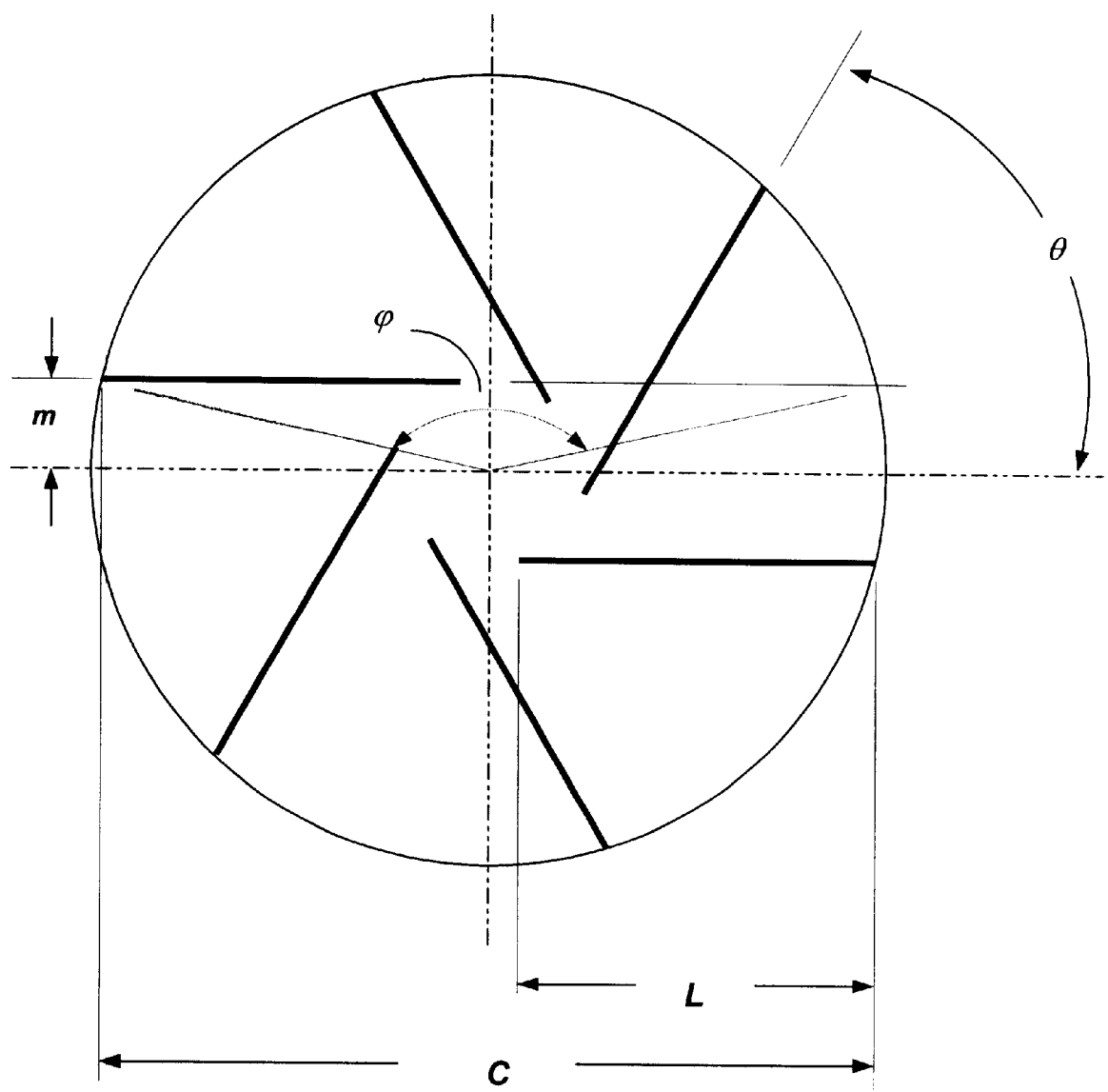
FIGS. 3A–3C shows a single heat exchange element according to the present invention and the geometry of the slot arrangement for n=6 and 5.

The present invention is drawn to a simple thin plate heat exchange element. As shown in FIG. 3A the plate is in the form of a cylindrical disk having a number of narrow slots, in this case 6, cut through the thickness of the disk and uniformly distributed about the center point of that disk. Each of the slots cut through the disk extends along a length, L, of a portion of the length of a chord, C, subtending the same angle $\phi$, wherein the angle $\phi$ is repeated n times by rotating the slot through an interval of 360°/n from each preceding slot such that n slots are present. Additionally, the slots are situated so that it is not possible to construct a line falling along a diameter anywhere across the disk which does not also cross one or more of these slots.

As originally conceived the slotted disk forms a flat "spring" when the outside diameter (O.D.) of the disk is constrained about its circumference by the inside diameter (I.D.) of the containing cylinder when these diameters are selected such that the disk O.D. is just slightly larger than the container ID. The applicants have found that the disk can be designed such that when it is cooled to cryogenic temperatures it can be reduced in size sufficiently to allow assembly into a cylindrical container having an inside diameter slightly less than the outside diameter of the disk. After placement of the disk in the desired location it is allowed to warm to room temperature at which point it is forced against the inner wall of the container as it expands. This expansion mechanically fixes the disk within the container forming a thermally conductive path between the disk and the container wall without further need for fasteners or other joining such as welding. The applicants have also found that by slotting the disks as described the disk element are prevented from buckling as they warm to room temperature and are forced against the inner wall of the container vessel. The slots act as strain relief features making the disk act as a spring. The end result is a container vessel having a disk mechanically attached across the inside wall of the vessel at the circumference of the disk.

An alternate means for reducing the diameter of the slotted disk in order to insert it into the container by pressing it through a conical "starter" funnel wherein one end of the funnel is slightly larger than the diameter of the unconstrained disk and wherein the opposite end of the funnel mates to the cylindrical container so that the inside diameters of the funnel is identical to slightly smaller than the container inside diameter. A light press has been found to be sufficient to compress the disk "spring" and to move it down the length of the container to the desired assembly location. The press mandrel is removed and the disk remains locked in place by spring tension.

Figure 4A:
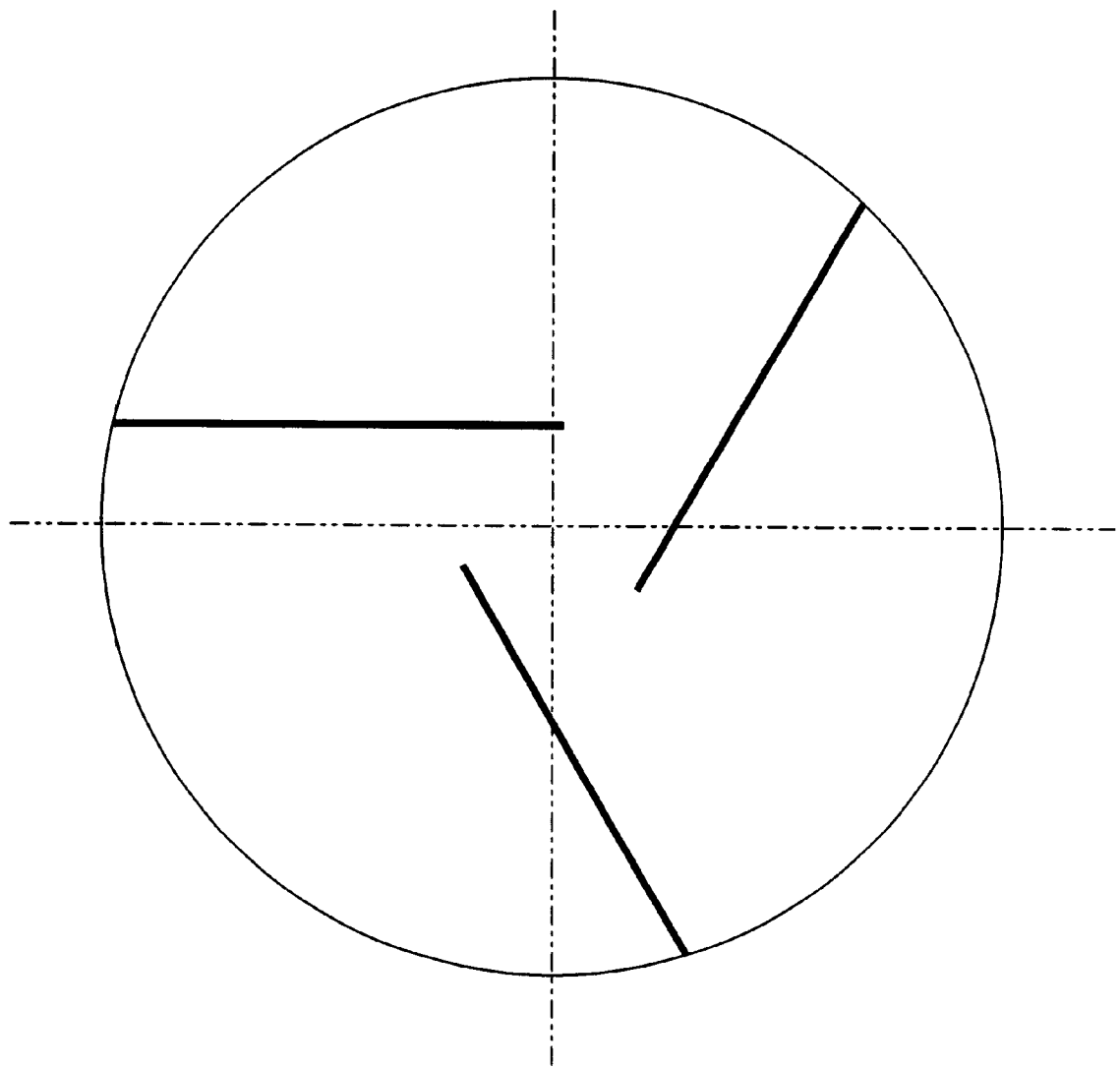
FIGS. 4A–4J shows various embodiment of the single heat exchange element wherein the number of slots, n, varies from 3 to 12.
Figure 4B:
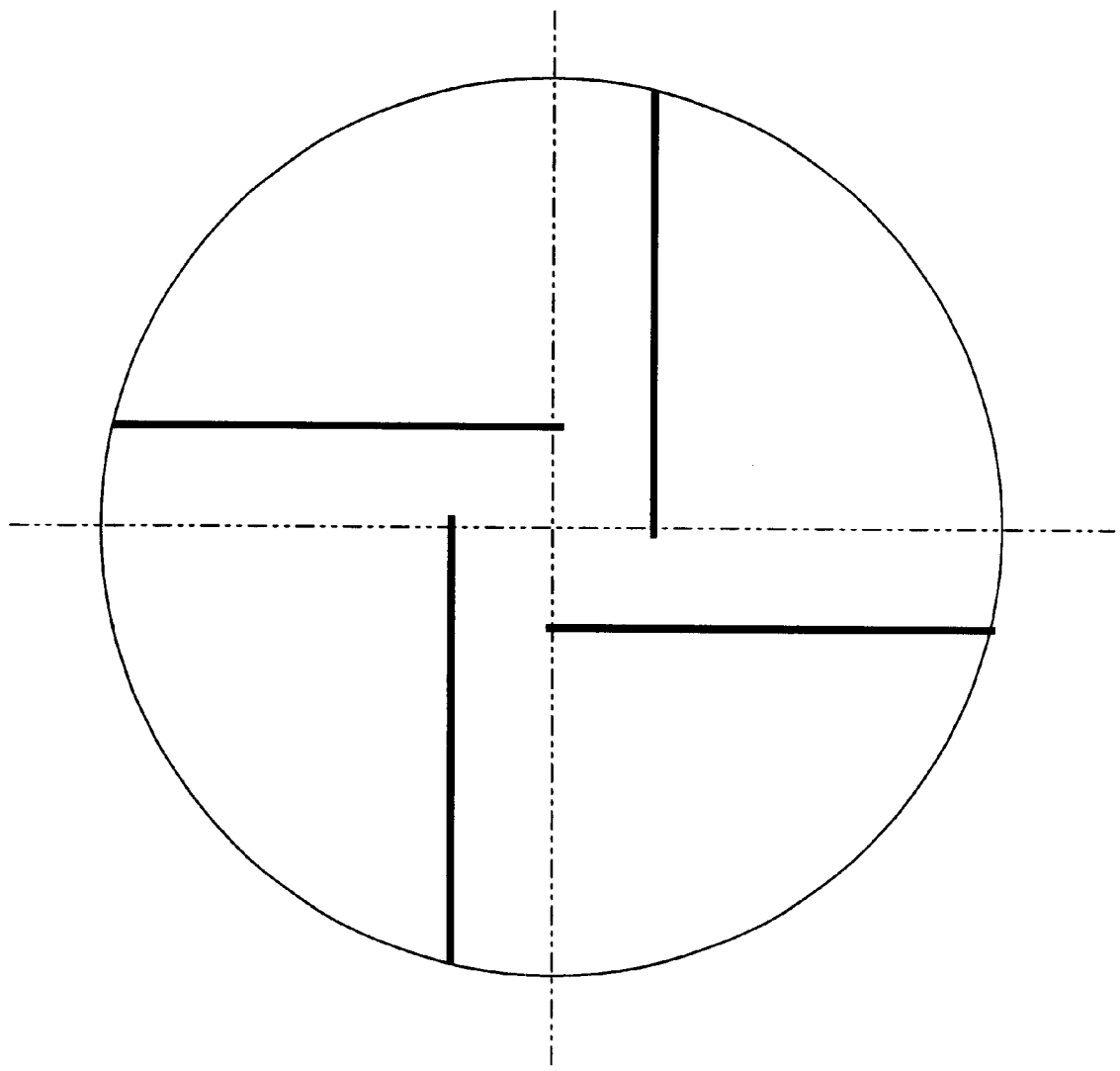
Figure 4C:
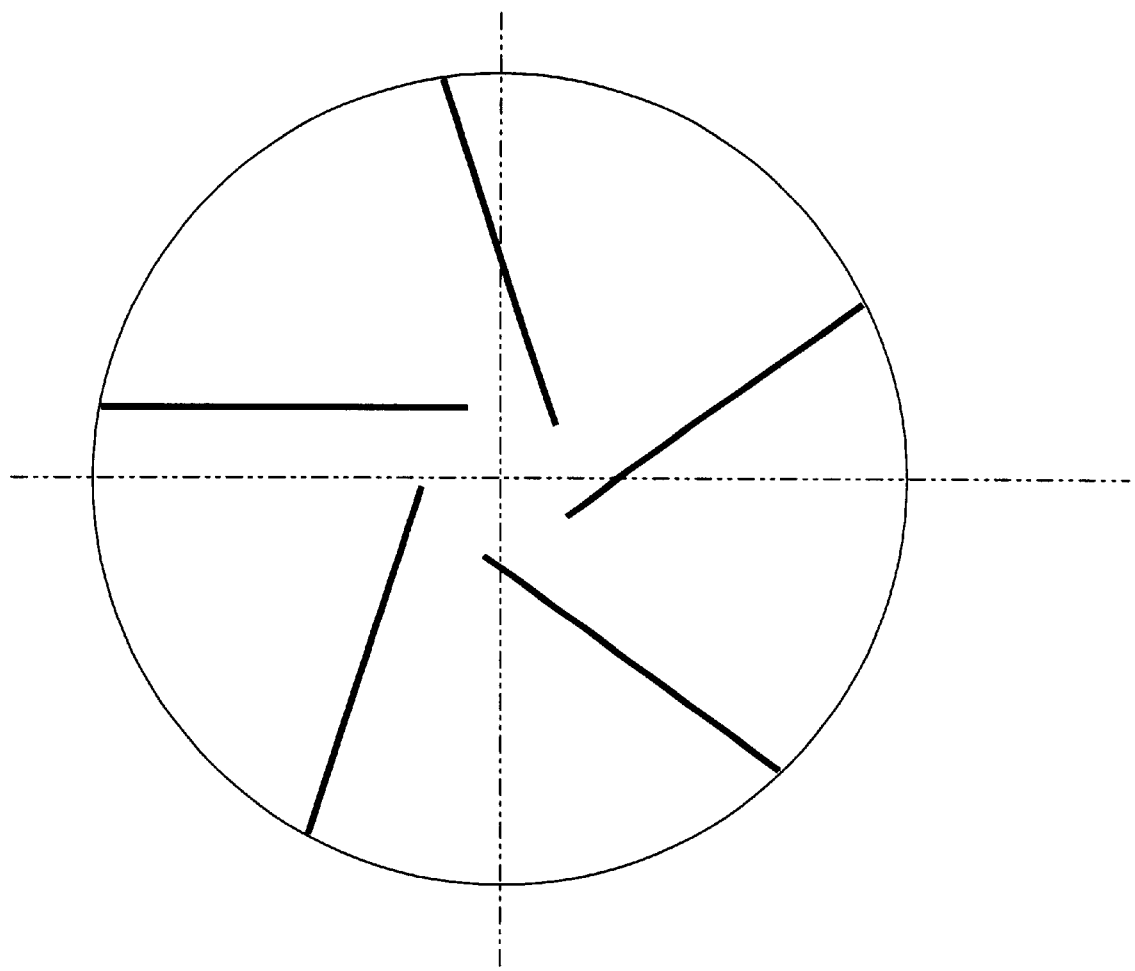
Figure 4D:
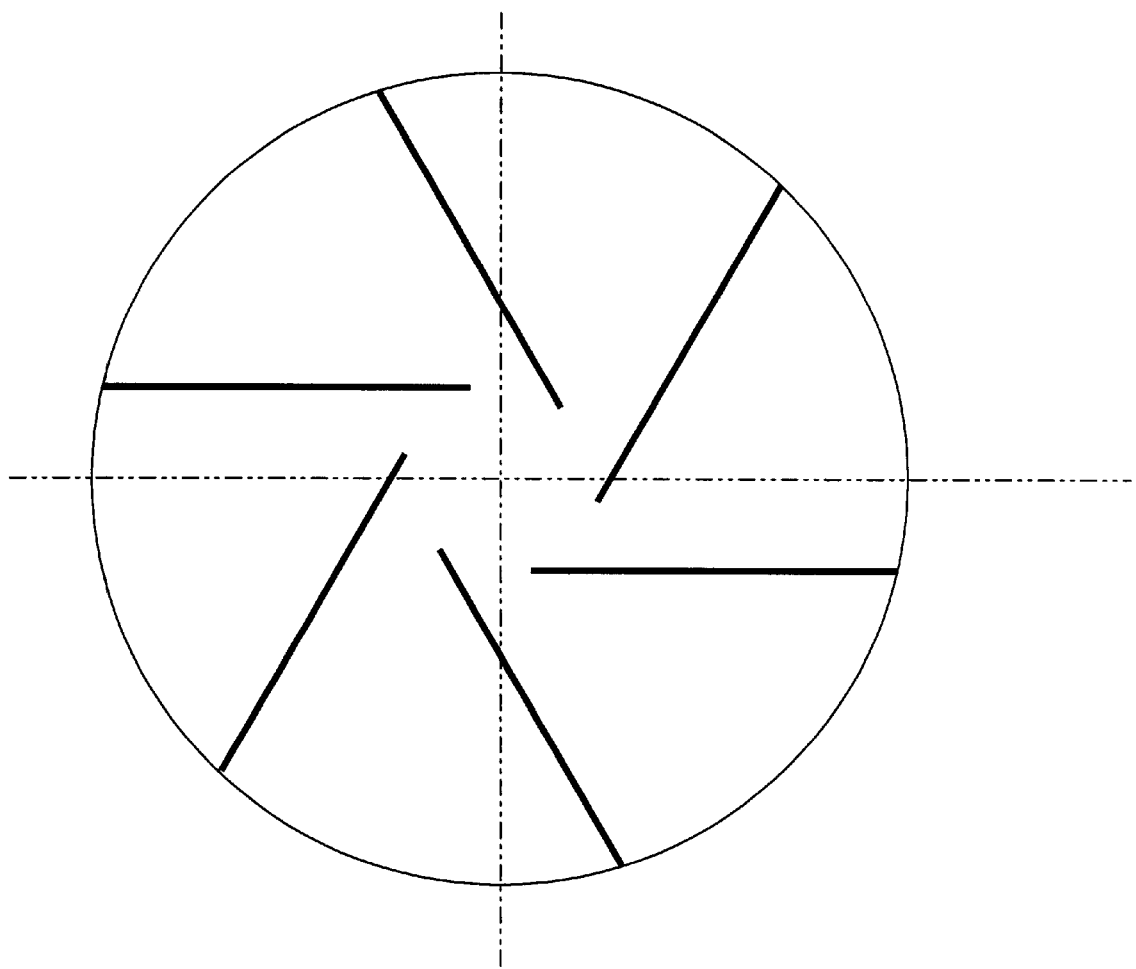
Figure 4E:
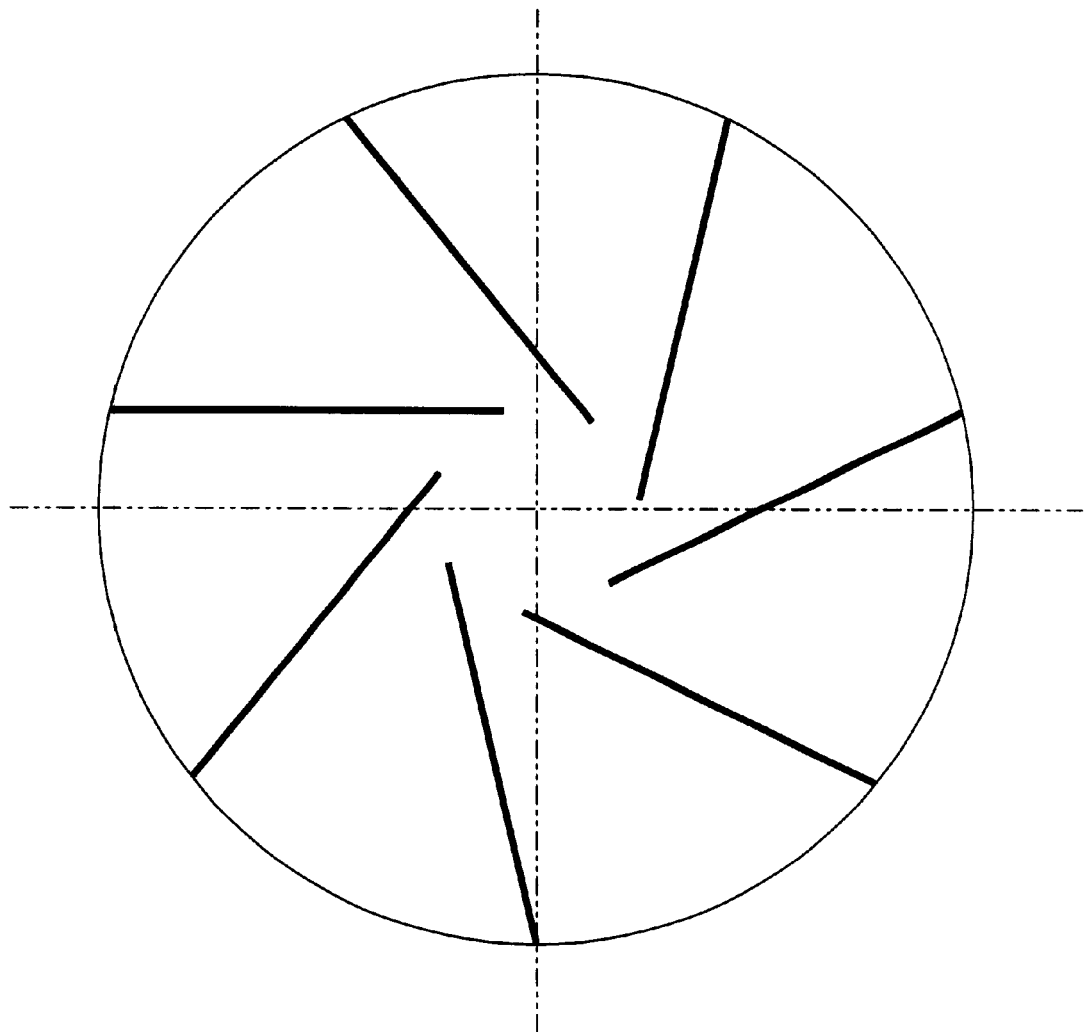
Figure 4F:
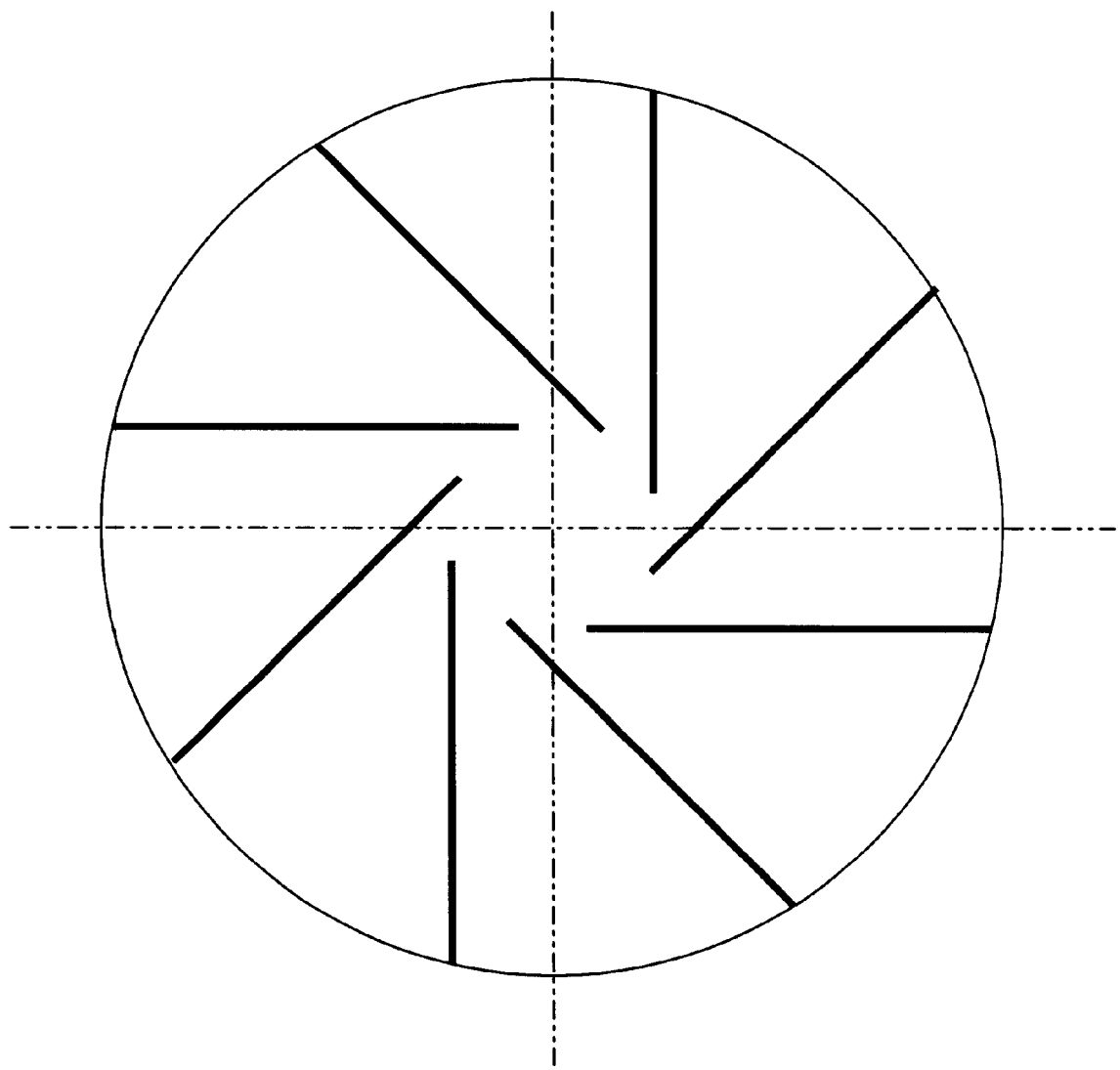
Figure 4G:
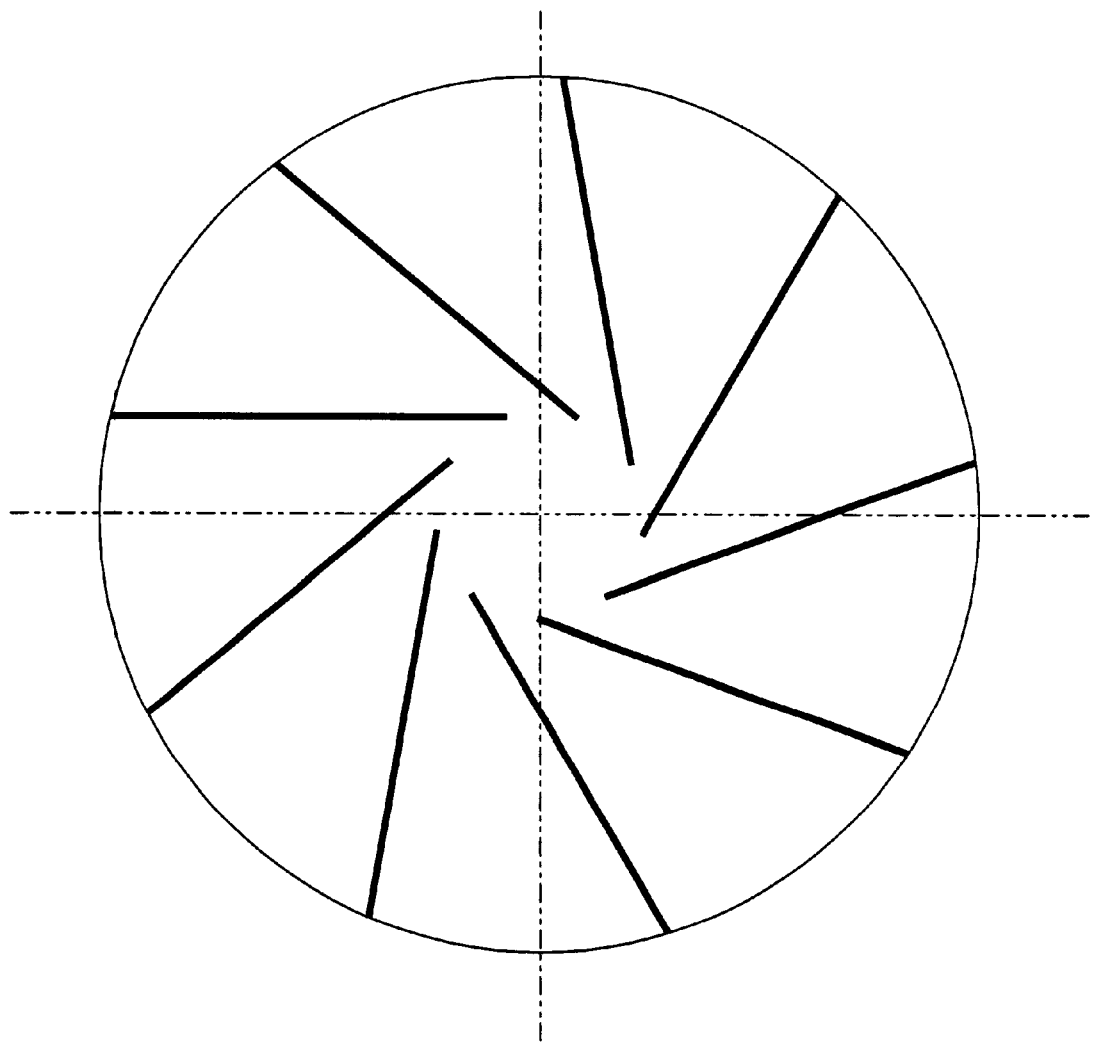
Figure 4H:
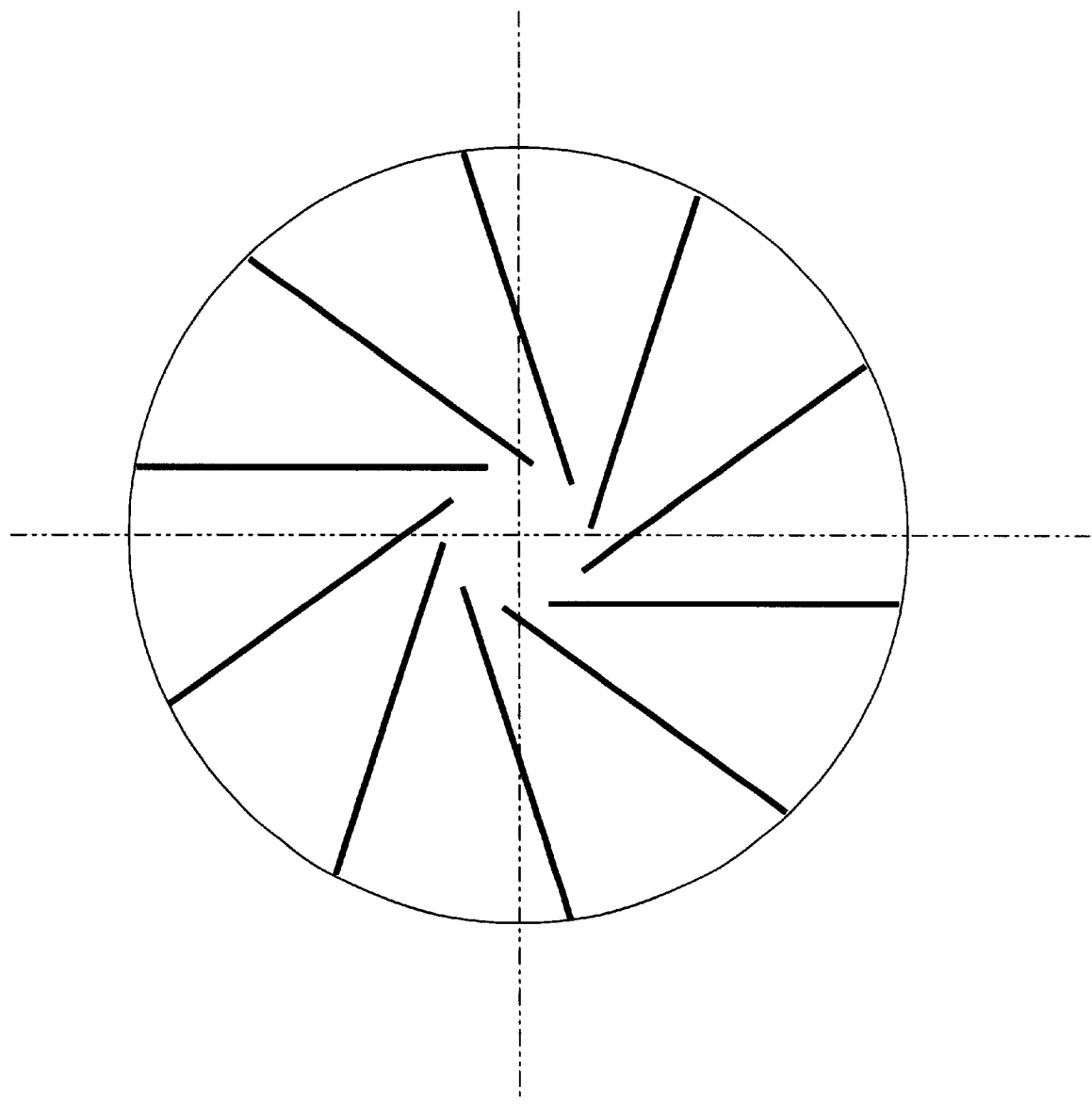
Figure 4I:
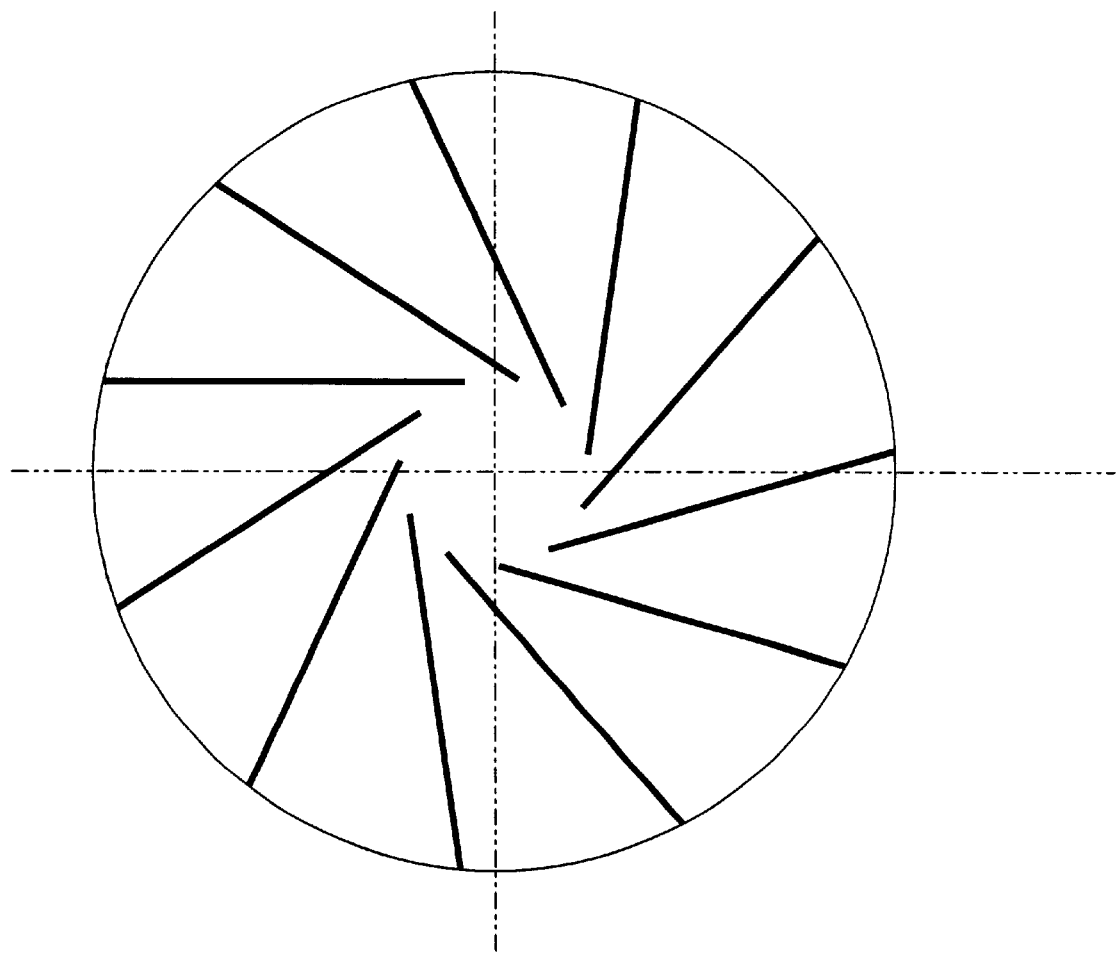
Figure 4J:
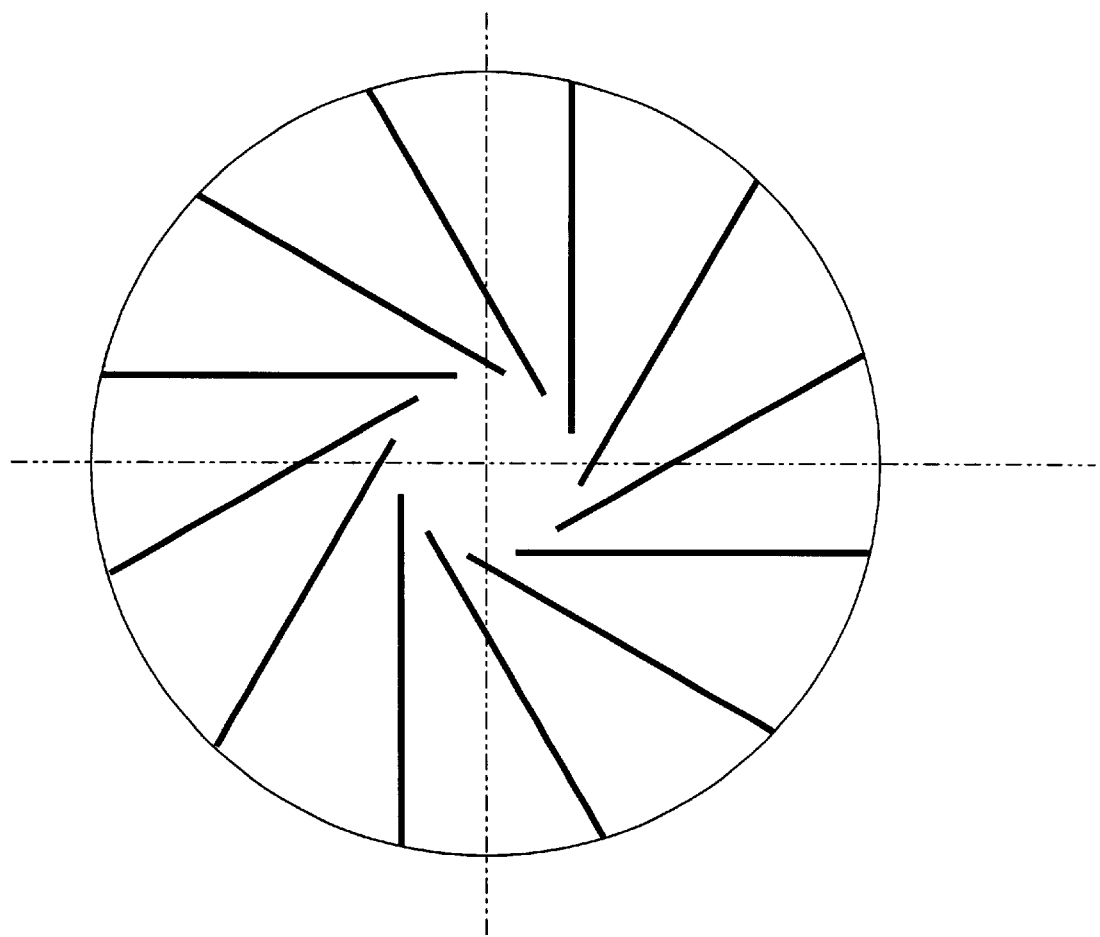

In a first embodiment, and the best mode of the invention known to the Applicants, herein illustrated in FIG. 4D, six slots are cut obliquely into the disk at 60° intervals around the center of the disk at a fixed distance from the center. While any similar method is applicable the slots of the present invention were prepared by electrical discharge machining ("EDM") which allows for close control of slot tolerances. A greater or fewer number of slots is possible, depending generally upon the mechanical stiffness of the material used and the overall size of the part vis-a-vis the part material coefficient of thermal expansion. FIGS. 4A–4J show exemplary disks wherein the number of slots, n, is varied from 3 to 12.

Figure 3B:
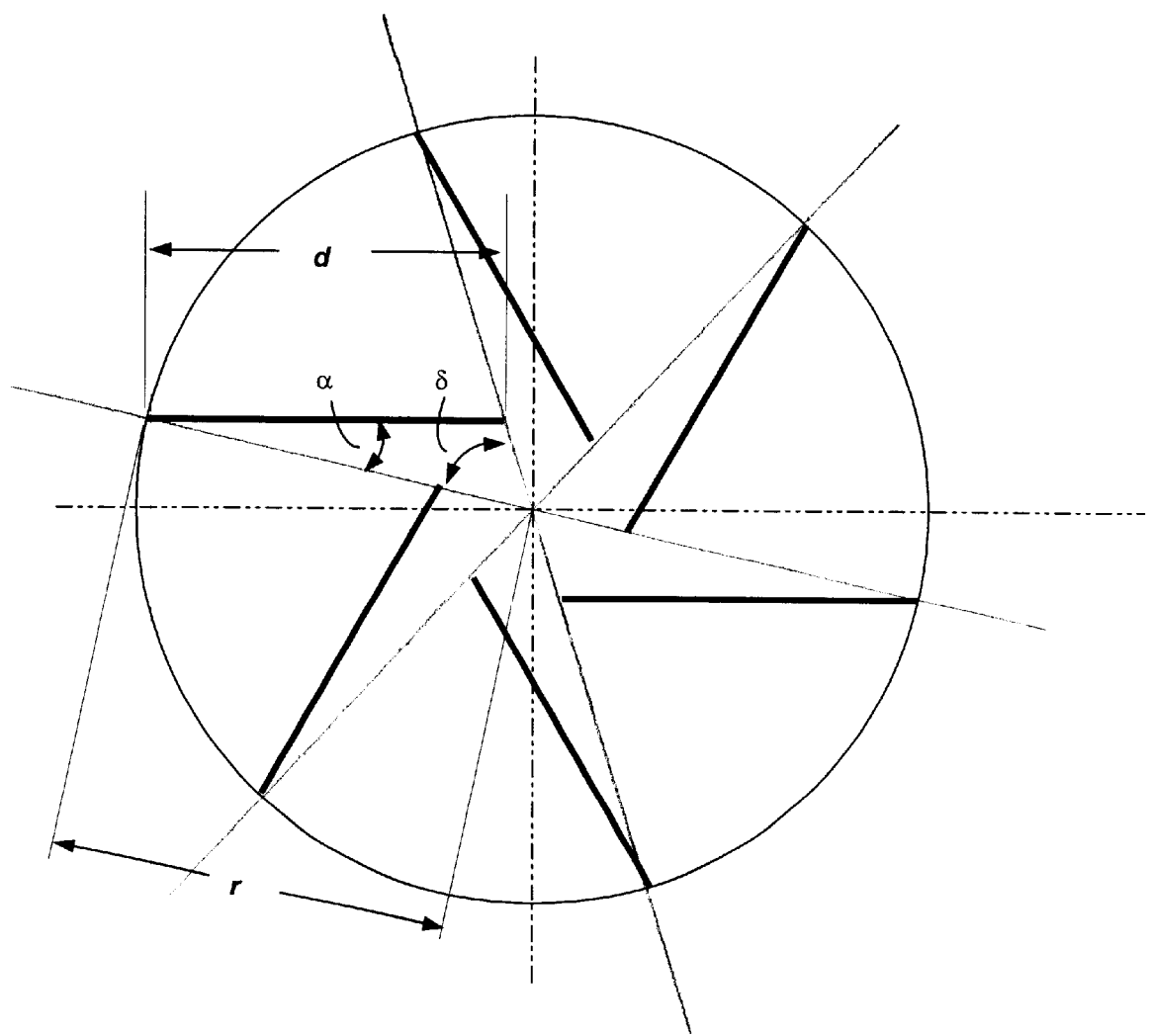
Figure 3C:
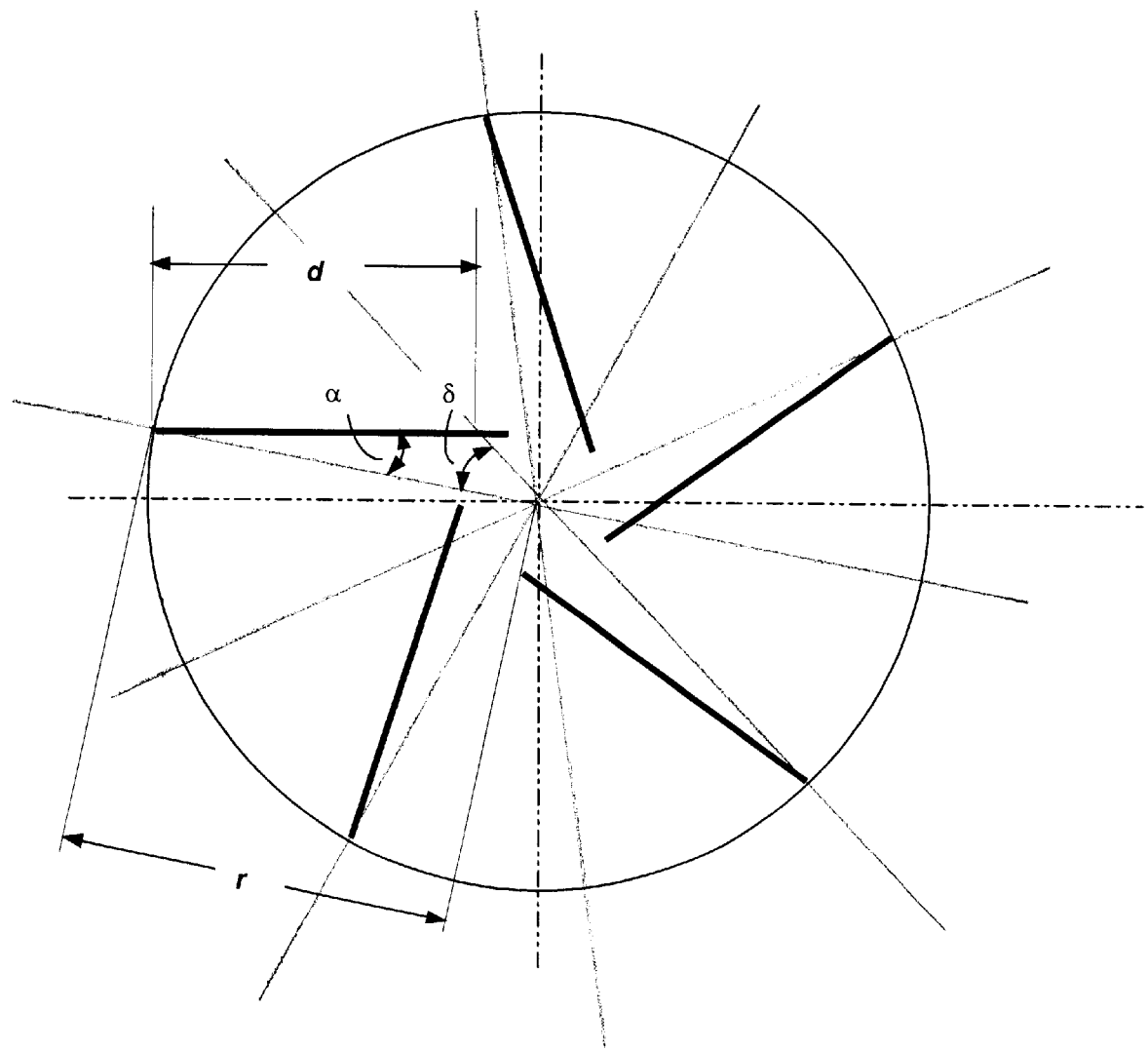

As noted, however, the disk of the present invention incorporates six uniformly spaced slots. Each of these slots extend over a length, L, about equal to the radius of the disk. Furthermore, each slot lies along a chord subtending an angle $\phi$ which, in this embodiment, is equal to about 154°. In general, however, as shown in FIGS. 3B and 3C, the condition that no diameter cross the face of the disk without also crossing at least one slot, is satisfied by setting, L, just greater than a length d, where d is equal to:

$$d = \frac{r \sin \delta}{\sin(\alpha + \delta)},$$

where r is the radius of the disk, $\alpha$ is the acute angle subtended by the chord and a line drawn between the center of the disk and the end of the chord lying along the O.D. of the disk (and by simple geometric construction seen to be equal to 90°–$\phi$/2), $\delta$ is either 360°/n, in the case where n is an even integer (as seen in FIG. 3B), or 360°/2n, in the case where n is an odd integer (as seen in FIG. 3C).

Lastly, the width, or kerf, of the slot is chosen to be large enough so as to not completely close at the tip (at the disk O.D.) when the disk is constrained within the container.

The disks themselves may be fabricated from any structural material that can serve as a heat exchanger element, i.e., a material having a high coefficient of thermal conductivity, herein generally taken to be above about 0.8–1.0 $Wcm^{-1}K^{-1}$. In the present invention, the disk elements were fabricated from 6061-T6 aluminum sheet stock having a thickness of about 0.09". Other similar materials, particularly alloys of iron, nickel, and copper, as well as virtually any of the other wrought, cast, or forged alloys of aluminum, would be as effective in varying degrees depending principally upon the mechanical stiffness of the material, and its thermal properties. However, structural alloys of aluminum have been found to be effective, inexpensive, and easy to fabricate and assemble, and are therefore preferred.

Each of these dimensions is of course, variable depending upon the desired final structure which might include one or more through-holes for allowing access to gas transfer conduit tubing. In practice, angle $\phi$ is chosen to place the slot at a desired off-set distance, m from the center of the disk. In actual practice the off-set distance, m, is one of design convenience, but would generally vary between about 0.1 r to about 0.33 r, where again r is the radius of the disk. By fixing m, angles $\phi$ and $\alpha$ are likewise fixed and therefore, vary between about 140° and 168°, and between about 20° and 6°, respectively. Additionally, in order to provide for the condition that no diameter pass across the disk without also cutting one or more of the slots, the slot length, L, must exceed length d, listed in Table 1 below, for each integer n numbers of slots, and for each of the chosen subtending angles $\phi$. In each of these cases the L is shown as fractions of disk radius r.

TABLE 1

Minimum Chord Length as a Function of n, and $\varphi$

| | | $\varphi$ | | | |
|---|---|---|---|---|---|
| n | $\delta$ | 140°<br>d | 152°<br>d | 160°<br>d | 168°<br>d |
| 3 | 60° | 0.88r | 0.90r | 0.92r | 0.95r |
| 4 | 90° | 1.06r | 1.03r | 1.02r | 1.01r |
| 5 | 36° | 0.71r | 0.77r | 0.82r | 0.88r |
| 6 | 60° | 0.88r | 0.90r | 0.92r | 0.95r |
| 7 | 26° | 0.61r | 0.68r | 0.74r | 0.82r |
| 8 | 45° | 0.78r | 0.82r | 0.86r | 0.91r |
| 9 | 20° | 0.53r | 0.61r | 0.68r | 0.78r |
| 10 | 36° | 0.71r | 0.77r | 0.82r | 0.88r |
| 11 | 16° | 0.47r | 0.56r | 0.63r | 0.74r |
| 12 | 30° | 0.65r | 0.72r | 0.78r | 0.85r |

Figure 5:
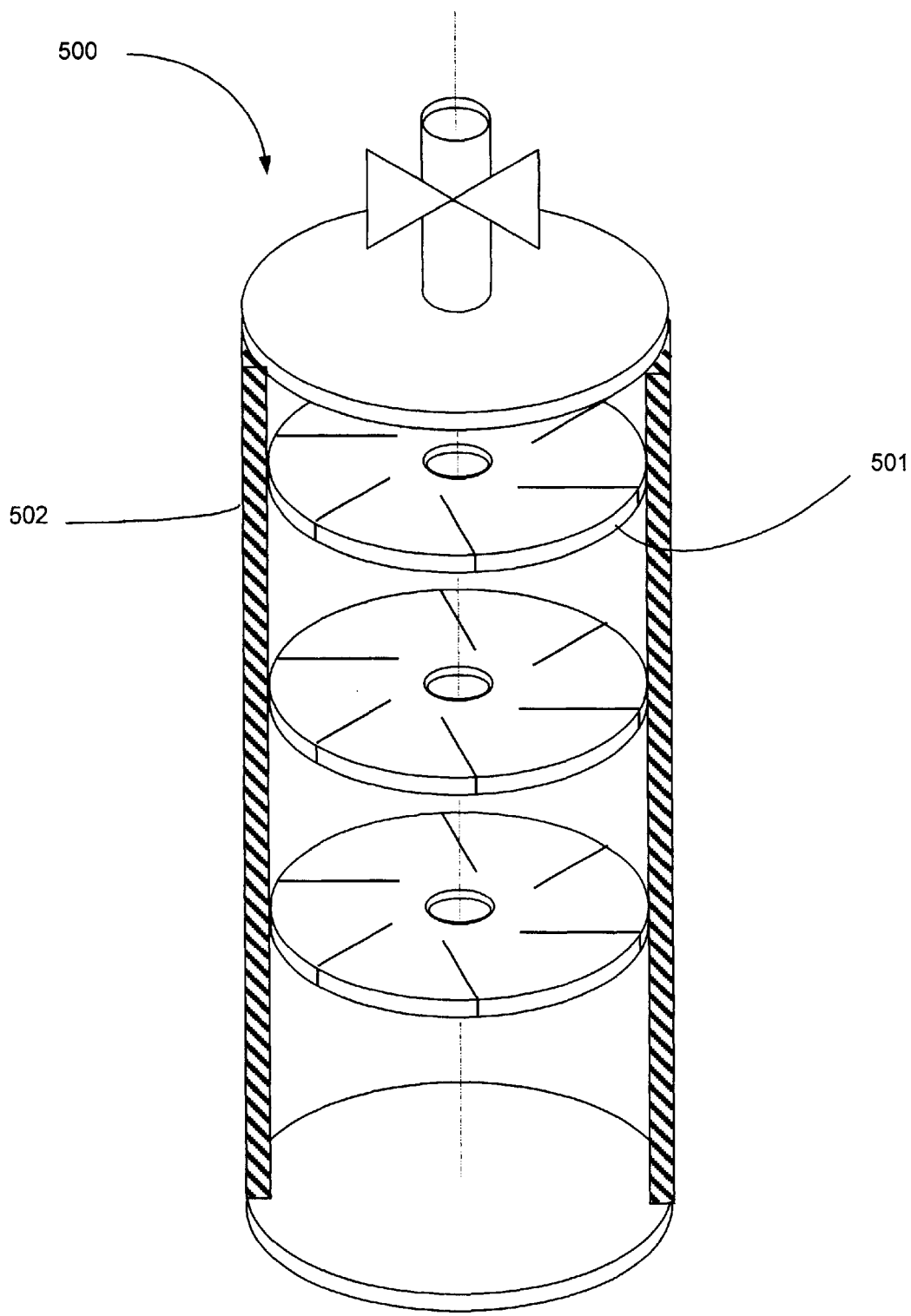
FIG. 5 shows an exemplary heat exchanger - hydride storage system of the present invention.

Finally, as shown in FIG. 5, it is intended that a plurality of the disks 501 are to be placed into the cylindrical reactor container 502 in order to partition a contained hydride powder. The disks thereby provide an effective means for moving heat into and away from the bulk of the powder and help to increase the efficiency of the reactor 500. The actual number of partitions used, however, is a matter of design choice and is not intended to be limiting with regard to the invention. Any reasonable number of disks might be used.

What is claimed is:

1. A heat exchange element, comprising:
   a cylindrical member comprising a material having a thermal conductivity greater than about 0.8 $Wcm^{-1}K^{-1}$, said cylindrical member further comprising a surface having a thickness and a radius r, said cylindrical member further having a plurality of n slots cut through said member thickness and along a portion of the length of a chord subtending an angle φ across said surface, said plurality of slots uniformly distributed about a center point of said cylindrical member.

2. The heat exchange element of claim 1, wherein the element comprises a material selected form the group of materials consisting of aluminum, copper, nickel, and iron, and alloys consisting essentially of said materials selected from said group.

3. The heat exchange element of claim 1, wherein the element comprises aluminum or an alloy thereof.

4. The heat exchange element of claim 1, wherein said n slots comprises from 3 to 12 slots.

5. The heat exchange element of claim 1, wherein the slot has a length L which exceeds a length d, wherein $$d = \frac{r \sin \delta}{\sin(\alpha + \delta)},$$

wherein α is equal to 90 °–φ/2 and wherein δ is equal to either 360°/n, if n is even, or 360°/2n, if n is odd.

6. The heat exchange element of claim 1, wherein said chord angle is chosen to displace said chord from said center point by a distance of from about 10% to about 33% of said radius r.

7. The heat exchange element of claim 1, wherein said angle φ varies from about 140° to about 168°.

8. The heat exchange element of claim 7, wherein said angle φ is about equal to 154°.

9. A hydrogen storage and dispensing system, comprising:

a vessel configured to contain a quantity of a hydride alloy, said vessel defining an interior cylindrical volume portion, said cylindrical volume portion bounded by an interior wall disposed about a longitudinal axis at an internal radius, said interior wall having a smooth continuous surface;

a plurality of slotted heat exchange elements comprising a radius and a circumference, said heat exchange elements disposed perpendicular to and uniformly along said longitudinal axis, said heat exchange element radius comprising an interference with said vessel internal radius such that each said element contacts and outwardly presses against said interior wall along said element circumference; and said quantity of hydride alloy disposed between said slotted heat exchange elements.

10. The hydrogen storage and dispensing system of claim 9 wherein the heat exchange elements comprise a material selected form the group of materials consisting of aluminum, copper, nickel, and iron, and alloys consisting essentially of said materials selected from said group.

11. The hydrogen storage and dispensing system of claim 9 wherein the heat exchange elements comprise aluminum, or an alloy thereof.

12. The hydrogen storage and dispensing system of claim 9 wherein the heat exchange elements each comprise a slotted disk.

* * * * *